United States Patent
Oh

(10) Patent No.: US 11,729,277 B2
(45) Date of Patent: Aug. 15, 2023

(54) APPARATUS AND METHOD FOR CONTROLLING APPLICATION RELOCATION IN EDGE COMPUTING ENVIRONMENT

(71) Applicant: Samsung Electronics Co., Ltd., Gyeonggi-do (KR)

(72) Inventor: Yangkyun Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 17/436,215

(22) PCT Filed: Mar. 2, 2020

(86) PCT No.: PCT/KR2020/002970
§ 371 (c)(1),
(2) Date: Sep. 3, 2021

(87) PCT Pub. No.: WO2020/180072
PCT Pub. Date: Sep. 10, 2020

(65) Prior Publication Data
US 2022/0141315 A1 May 5, 2022

(30) Foreign Application Priority Data
Mar. 4, 2019 (KR) .................. 10-2019-0024673

(51) Int. Cl.
*H04L 67/00* (2022.01)
*H04W 4/50* (2018.01)
(Continued)

(52) U.S. Cl.
CPC .......... *H04L 67/34* (2013.01); *H04L 67/1012* (2013.01); *H04L 67/1021* (2013.01);
(Continued)

(58) Field of Classification Search
None
See application file for complete search history.

(56) References Cited

U.S. PATENT DOCUMENTS 10,104,672 B2 10/2018 Shah
10,231,155 B2 3/2019 Kikuchi
(Continued)

FOREIGN PATENT DOCUMENTS

EP  3 282 718 A1  2/2018
JP  2018-67935 A  4/2018
(Continued)

OTHER PUBLICATIONS

Mobile Edge Computing (MEC); End to End Mobility Aspects, 2017.
Korean Office Action dated May 24, 2023.

*Primary Examiner* — Lashonda Jacobs-Burton
(74) *Attorney, Agent, or Firm* — Cha & Reiter, LLC

(57) ABSTRACT

An electronic device and method are disclosed. The electronic device operates in an edge computing environment, and includes: a memory storing an application, a wireless communication circuitry, and at least one processor. The at least one processor implements the method, including: receiving a query message querying whether application relocation is possible from an external server through wireless communication circuitry, identifying, using at least one processor, whether the application relocation is possible based on a running state of the application, in response to receiving the query message, when the application relocation is impossible, transmitting a first response message indicating that the application relocation is impossible to the external server, or when the application relocation is possible, transmitting a second response message indicating that the application relocation is possible to the external server.

15 Claims, 10 Drawing Sheets

(51) Int. Cl.
  *H04L 67/148* (2022.01)
  *H04W 88/18* (2009.01)
  *H04L 67/1021* (2022.01)
  *H04L 67/1012* (2022.01)
  *H04L 67/1025* (2022.01)

(52) U.S. Cl.
  CPC ........ *H04L 67/1025* (2013.01); *H04L 67/148* (2013.01); *H04W 4/50* (2018.02); *H04W 88/182* (2013.01)

(56) References Cited

U.S. PATENT DOCUMENTS

| | | |
|---|---|---|
| 10,448,239 B2 | 10/2019 | Faccin et al. |
| 10,470,192 B2 | 11/2019 | Fang et al. |
| 10,716,034 B2 | 7/2020 | Trang et al. |
| 11,057,768 B2 | 7/2021 | Kikuchi |
| 2018/0049179 A1 | 2/2018 | Shah |
| 2018/0227743 A1 | 8/2018 | Faccin et al. |
| 2018/0263039 A1 | 9/2018 | Fang et al. |
| 2019/0053108 A1* | 2/2019 | Trang ............... H04W 36/0033 |
| 2019/0098474 A1* | 3/2019 | Zhu ..................... H04W 4/50 |
| 2020/0351745 A1* | 11/2020 | Alnås ............... H04W 36/0009 |

FOREIGN PATENT DOCUMENTS

| | | |
|---|---|---|
| KR | 10-2008-0095036 A | 10/2008 |
| KR | 10-2018-0112825 A | 10/2018 |
| WO | 2018/089417 A1 | 5/2018 |

* cited by examiner

| WHETHER APPLICATION RELOCATION IS POSSIBLE 710 (MANDATORY) | RESOURCE INFORMATION 720 (OPTIONAL) | TIME INFORMATION 730 (OPTIONAL) |
|---|---|---|

APPARATUS AND METHOD FOR CONTROLLING APPLICATION RELOCATION IN EDGE COMPUTING ENVIRONMENT

CROSS REFERENCE TO RELATED APPLICATIONS

This application is a National Phase Entry of PCT International Application No. PCT/KR2020/002970, which was filed on Mar. 2, 2020, and claims a priority to Korean Patent Application No. 10-2019-0024673, which was filed on Mar. 4, 2019, the contents of which are incorporated herein by reference.

TECHNICAL FIELD

Embodiments disclosed in the disclosure relate to an apparatus and a method for controlling application relocation in an edge computing environment.

BACKGROUND ART

Recently, there have been discussions on an "edge" or "edger" computing technology, which transmits data using an edge server. Edge computing technology may include mobile edge computing, multi-access edge computing (MEC), and/or "fog" computing technology. Edge computing technology may refer to server-based data provision to an electronic device (e.g., through an edge server or an MEC server), in which the server is installed in a location geographically proximate to the electronic device, such as, for example, in or near a base station serving the electronic device. For example, an application from among multiple apps installed in the electronic device may require a specified low latency, and thus may transmit data through a geographically-proximate edge server, without passing through a server located in a more distal or remote data network (DN) (e.g., the Internet).

DISCLOSURE

Technical Problem

Certain standards (e.g., ETSI MEC) which proceed from the European telecommunications standards institute (ETSI) define a problem in application relocation generated by a ping-pong handover (HO). The ping-pong HO refers to an operation in which a user equipment (UE) repeatedly moves through coverage boundaries (e.g., coverage areas or "cells") of different base stations. Accordingly, "application relocation" refers to an operation in which the UE changes edge computing service providers. For example, a mobile edge host (MEH) or an ME application may change by the application relocation.

A problem in application relocation generated by the ping-pong HO may include waste of resources due to repeated application relocations, when the ping-pong HO occurs in an edge computing environment, resulting in loss or reduction in to continuity of service as perceived by a user.

Certain embodiments disclosed in the disclosure may provide an apparatus and a method for controlling application relocation in an edge computing environment.

Technical Solution

In accordance with an aspect of the disclosure, an electronic device in an edge computing environment is provided. The electronic device may include a memory storing an application, wireless communication circuitry, at least one processor operatively connected with the memory and the wireless communication circuitry, wherein the at least one processor is configured to: receive a query message querying whether application relocation is possible from an external server, via the wireless communication circuitry, identify whether the application relocation is possible based on a running state of the application, in response to receiving the query message, and when the application relocation is impossible, transmit a first response message indicating that the application relocation is impossible to the external server, via the wireless communication circuitry, or when the application relocation is possible, transmit a second response message indicating that the application relocation is possible to the external server, via the wireless communication circuitry.

In accordance with another aspect of the disclosure, a method of an electronic device in an edge computing environment is provided. The method may include receiving a query message querying whether application relocation is possible from an external server through wireless communication circuitry, identifying, using at least one processor, whether the application relocation is possible based on a running state of the application, in response to receiving the query message, when the application relocation is impossible, transmitting a first response message indicating that the application relocation is impossible to the external server, or when the application relocation is possible, transmitting a second response message indicating that the application relocation is possible to the external server.

In accordance with another aspect of the disclosure, an external server in an edge computing environment is provided. The external server may include a memory, a wireless communication circuit, and at least one processor. The processor may execute detecting a triggering event of application relocation, transmitting a query message querying whether the application relocation is possible to an electronic device which receives an edge computing service, pausing the application relocation, when a first response message indicating that the application relocation is impossible is received from the electronic device, and executing the application relocation, when a second response message indicating that the application relocation is possible is received from the electronic device.

Advantageous Effects

According to embodiments disclosed in the disclosure, the electronic device may prevent waste of resources in a ping-pong handover context, and better ensure continuous provision of service to user equipment.

In addition, various effects ascertained directly or indirectly through the disclosure may be provided.

DESCRIPTION OF DRAWINGS

FIG. 7 illustrates a field format of a response message according to certain embodiments;

With regard to description of drawings, the same or similar denotations may be used for the same or similar components.

MODE FOR INVENTION

Hereinafter, certain embodiments of the disclosure may be described with reference to accompanying drawings. However, it should be understood that this is not intended to limit the present disclosure to specific implementation forms and includes various modifications, equivalents, and/or alternatives of embodiments of the present disclosure.

Figure 1:
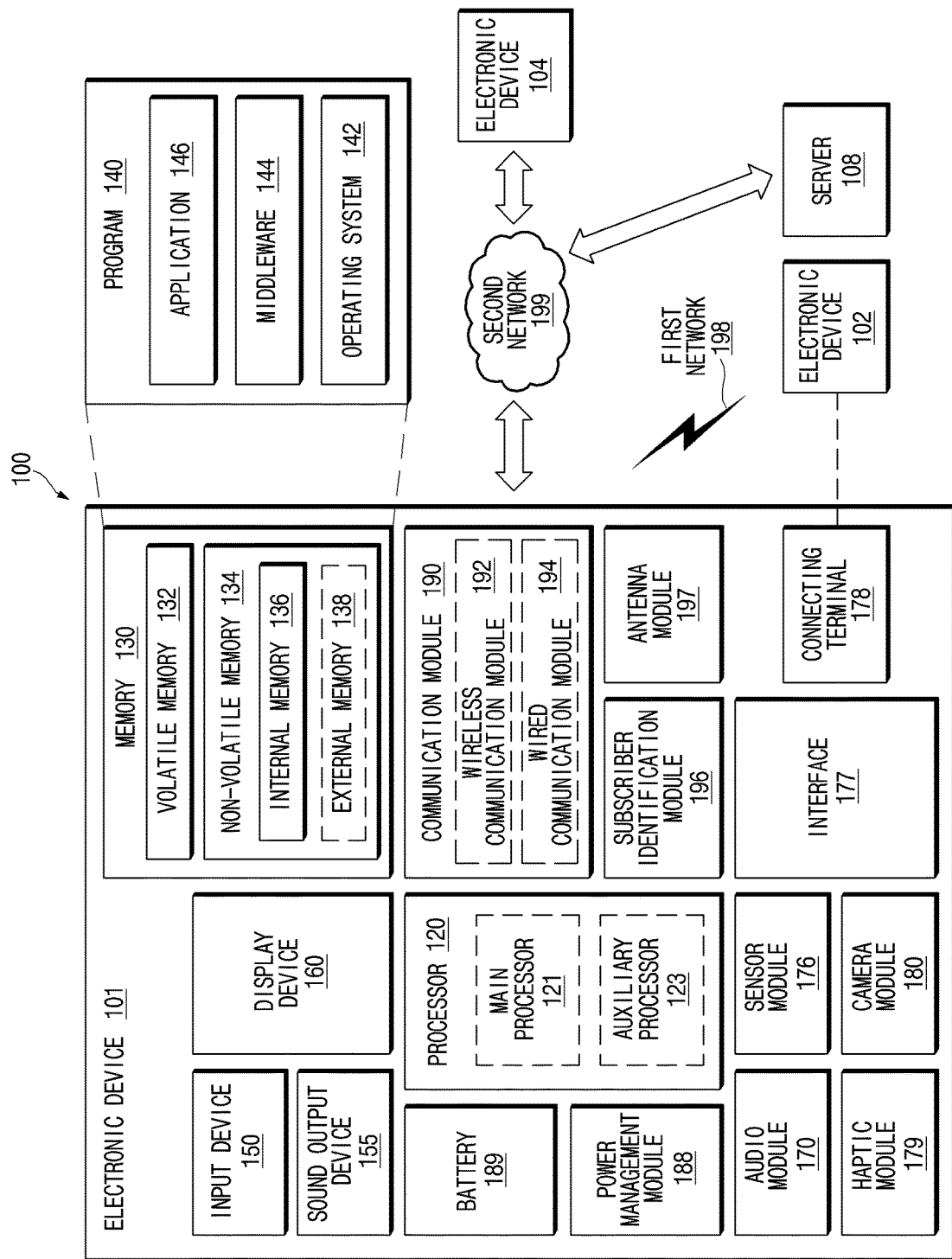
FIG. 1 is a block diagram illustrating an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
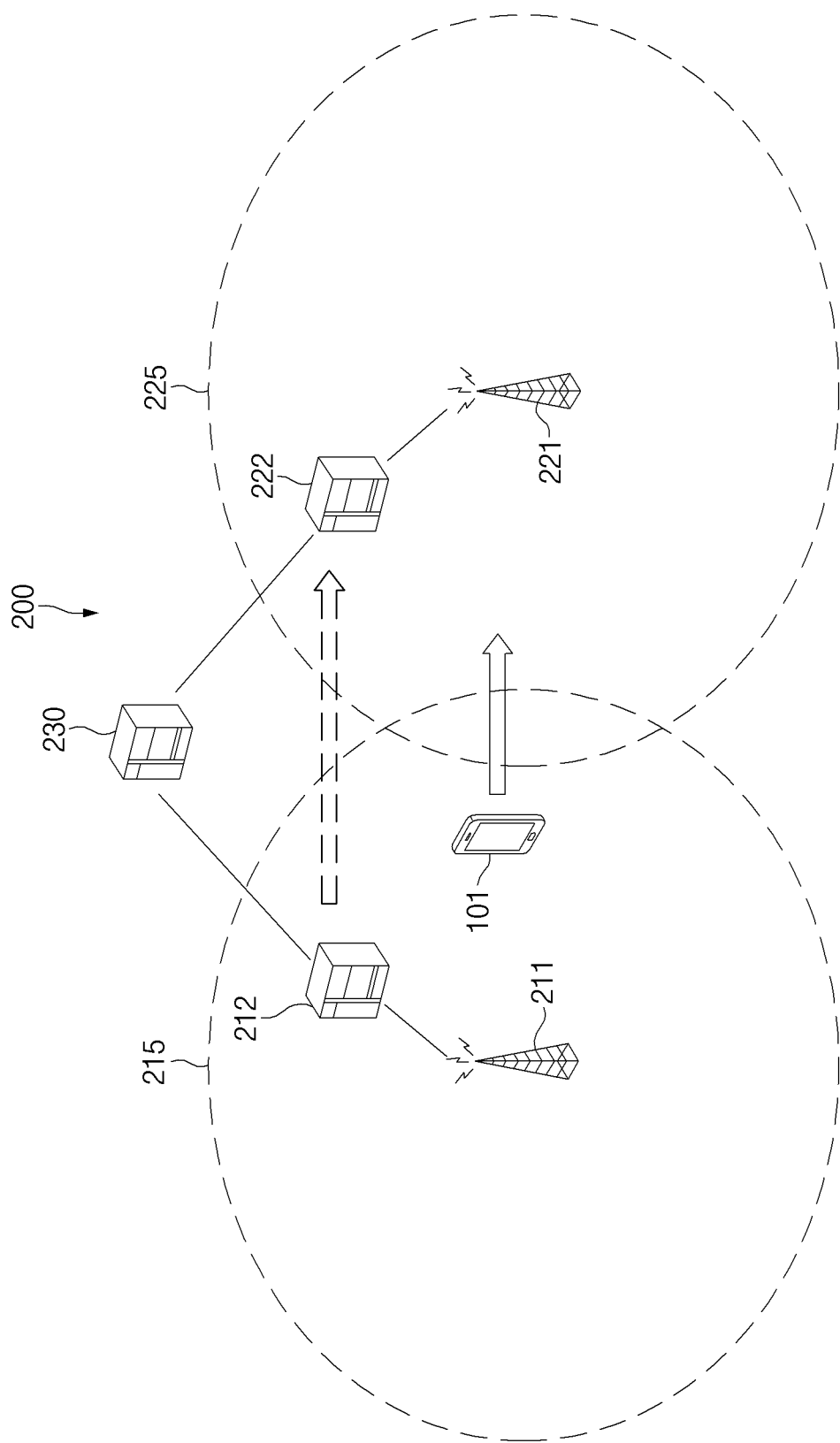
FIG. 2 illustrates an edge computing environment according to certain embodiments.

FIG. 2 illustrates an edge computing environment 200 according to certain embodiments.

Referring to FIG. 2, the edge computing environment 200 (e.g., a network environment 100 of FIG. 1) may include an MEC computing environment. A technology for the MEC computing environment may be based on ETSI MEC standards. The edge computing environment 200 may include a plurality of base stations 211 and 221, a plurality of edge servers 212 and 222, a server 230, and an electronic device 101.

According to an embodiment, the electronic device 101 may refer to a device used by a user. The electronic device 101 may refer to, for example, a terminal, user equipment (UE), a mobile station, a subscriber station, a remote terminal, a wireless terminal, or a user device.

According to an embodiment, the base stations 211 and 221 may provide a channel for wireless communication with the electronic device 101. The base station 211 or 222 may refer to a radio access network (RAN), an access node (AN), an eNodeB (eNB), a 5G node, a transmission/reception point (TRP), or a 5th generation NodeB (5GNB). A technology about wireless communication between the base stations 211 and 221 and the electronic device 101 may be based on standards defined in 3rd generation partnership project (3GPP).

According to an embodiment, the base station 211 or 221 may include a cell (or coverage area) for performing wireless communication with the electronic device 101. For example, the first base station 211 may include a first cell 215, and the second base station 221 may include a second cell 225. The number and form of the cells shown in FIG. 2 is merely illustrative. For example, the base station 211 or 221 may include a plurality of cells or may include a cell of a different form (e.g., hexagon).

According to an embodiment, the edge server 212 or 222 may be referred to as an MEC server or a fog computing server. The edge servers 212 and 222 may be arranged in the base stations 211 and 221 or at locations geographically close to the base stations 211 and 221. For example, the first edge server 212 may be located in the first base station 211 or at a location geographically close to the first base station 211, and the second edge server 222 may be located in the second base station 221 or at a location geographically close to the second base station 221. The electronic device 101 may perform data communication with a network (e.g., a second network 199 of FIG. 2) through a base station (e.g., the first base station 211) to which the electronic device 101 is connected or may perform data communication with the first edge server 212. The network may include a data network (DN) such as the Internet.

For example, the electronic device 101 may perform data communication with one between the network and the first edge server 212 or a plurality of entities (or infras) based on at least one of latency required by an application, a data transfer rate, or a type of content. The content type may include, for example, a game, a streaming service, a social network service (SNS).

According to an embodiment, when the electronic device 101 moves geographically, a base station and an edge server to which the electronic device 101 is connected may change. For example, when the electronic device 101 moves from the first cell 215 into the second cell 225 (as shown), a handover is executed where the base station which provides the electronic device 101 with wireless communication changes from the first base station 211 to the second base station 221. For another example, "application relocation" may be executed as well, where an edge server which serves the electronic device 101 changes from the first edge server 212 to the second edge server 222. When a ping-pong handover occurs, in which the electronic device 101 repeatedly crosses the geographic boundary of the first cell 215 and the second cell 225, application relocation may be repeatedly performed. When the application relocation is repeatedly performed, resources may be wasted and continuity of service may decrease.

According to an embodiment, the server 230 may manage the application relocation of the edge servers 212 and 222 in the edge computing environment 200, thus preventing resources from being wasted in the ping-pong handover environment and maintaining the continuity of service. For example, the server 230 may query whether application relocation is possible in the electronic device 101. When the application relocation is possible in the electronic device 101, the server 230 may instruct the edge servers 212 and 222 to perform the application relocation. When it is not possible for the electronic device 101 to execute the application relocation, the server 230 may delay an operational onset time of the application relocation, or even pause the application relocation until the application relocation is determined to be possible in the electronic device 101.

FIG. 2 illustrates the embodiment in which the control of the application relocation is performed by the separate server 230. However, according to other embodiments, the first edge server 212 or the second edge server 222 may control the application relocation. In this case, the edge computing environment 200 may fail to include the server 230.

Figure 3:
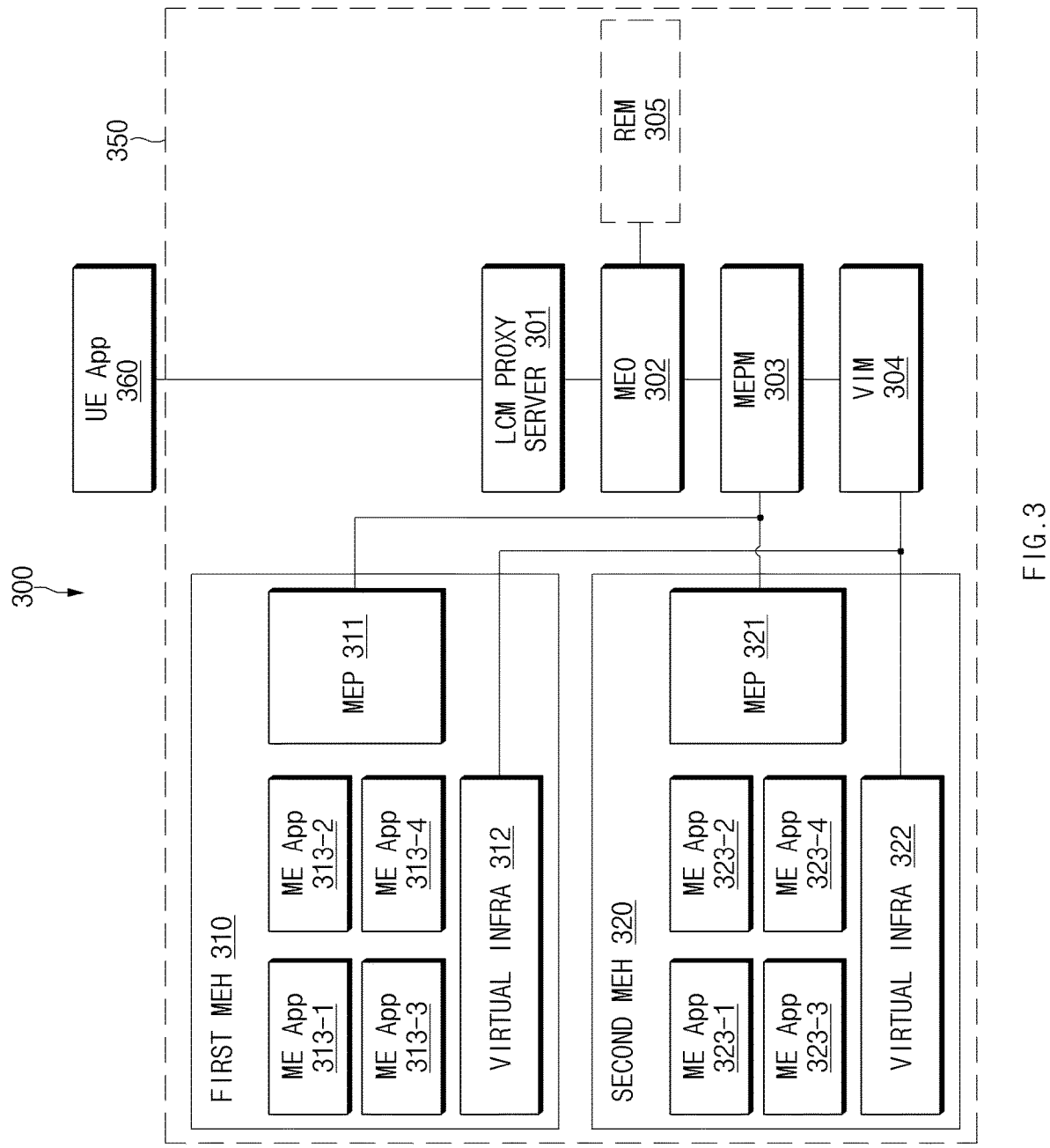
FIG. 3 illustrates an edge computing environment including an MEC system according to certain embodiments.

FIG. 3 illustrates an example edge computing environment 300 (e.g., an edge computing environment 200 of FIG. 2), including an MEC system 350 according to certain embodiments.

Referring to FIG. 3, the edge computing environment 300 may include the MEC system 350 and a UE application (App) 360. The UE App 360 may refer to an application executing on the electronic device 101. The UE App 360 may receive an edge computing service from the MEC system 350, and may provide a user with the received service. Although not illustrated in FIG. 3, the UE App 360 may perform wireless communication through a base station (e.g., 211 or 221 of FIG. 2) arranged between an electronic device 101 and the MEC system 350.

The MEC system 350 may include a life cycle management (LCM) proxy server 301, a mobile edge orchestrator (MEO) 302, a mobile edge platform manager (MEPM) 303, a virtualization infra manager (VIM) 304, a relocation manager (REM) 305, and a plurality of mobile edge hosts (MEHs) (e.g., 310 and 320).

According to an embodiment, the LCM proxy server 301 may perform an interface function of an MEC service. For example, the LCM proxy server 301 may receive a request for information about ME Apps providable by the MEC system 350 from the electronic device 101. For another example, the LCM proxy server 301 may perform management for life cycles of ME Apps (e.g., 313-1, 313-2, 313-3, 313-4, 323-1, 323-2, 323-3, 323-4, . . . ) installed in the MEC system 350. The LCM proxy server 301 may receive a request of the electronic device 101 for a life cycle, such as instantiation or termination of the application, and may deliver the received request to the MEO 302. An instance of the application may be a set of instructions for running the application, and the instantiation may refer to an operation where an MEH (e.g., 310 or 320) runs an ME App. For another example, the LCM proxy server 301 may receive a request for application relocation from the electronic device 101 and may deliver the received request to the MEO 302.

According to an embodiment, the MEO 302 may manage and maintain the overall function of data transmission based on the MEC system 350. The MEO 302 may manage a function of data transmission based on at least one of a resource available in the MEC system 350, a service available in the MEC system 350, a rule and a requirement of an application, a policy of an operator, or a topology. For example, the MEO 302 may select an MEH suitable for the UE App 360 or may grant instantiation or termination of the application.

According to an embodiment, the MEO 302 may manage application relocation together with the REM 305. In this case, the MEO 302 or the REM 305 may perform a function of a server 230 of FIG. 2. For example, when an application relocation triggering event occurs, the MEO 302 may query the electronic device 101 whether application relocation is possible in the electronic device 101. When it is not possible for the electronic device 101 to execute the application relocation, the MEO 302 may delay an operation time point of the application relocation or may pause the application relocation until the application relocation is possible in the electronic device 101.

According to an embodiment, the REM 305 may be included in the MEO 302 or may be a separate entity. According to an embodiment, the REM 305 may perform the same function as the MEO 302.

According to an embodiment, the MEPM 303 may manage life cycles of ME Apps which operate in the MEH (e.g., 310 or 320) and may deliver information associated with the life cycles to the MEO 302. According to another embodiment, the MEPM 303 may deliver or manage information for causing ME Apps to operate to an MEP (e.g., 311 or 321). The information for causing the ME Apps to operate may include at least one of, for example, a rule of the application, a requirement, a service grant, or a traffic rule.

According to an embodiment, the VIM 304 may allocate, release, or expand a virtualized operating environment for running an ME App in the MEH (e.g., 310 or 320).

According to an embodiment, the MEHs 310 and 320 may provide basic calculation, storage, and networking for running the ME Apps (e.g., 313-1, 313-2, 313-3, 313-4, 323-1, 323-2, 323-3, 323-4, . . . ) installed in the MEC system 350. The first MEH 310 and the second MEH 320 may perform the same or at least some similar functions to a first edge server 212 and a second edge server 222 of FIG. 2. FIG. 3 illustrates the first MEH 310 and the second MEH 320, but the number of MEHs included in the MEC system 350 is not limited thereto.

According to an embodiment, the first MEH 310 may include the plurality of ME Apps 313-1, 313-2, 313-3, and 313-4, a virtual infra 312, and the mobile edge platform (MEP) 311. The second MEH 320 may perform the same or at least some similar functions to the first MEH 310 and may include the same or at least some similar components to the first MEH 310. A description of components of the second MEH 320, which are duplicated with the components of the first MEH 310, will be omitted.

According to an embodiment, the ME App (e.g., 313-1, 313-2, 313-3, or 313-4) may refer to a service instance run on the virtual infra 312. The ME App may be generated by a request of the UE App 360 and may provide a service requested by the UE App 360.

According to an embodiment, the MEP 311 may provide a function for running of the ME App. For example, the MEP 311 may perform MEC service registry and discovery, traffic control, and domain name server (DNS) control.

Figure 4:
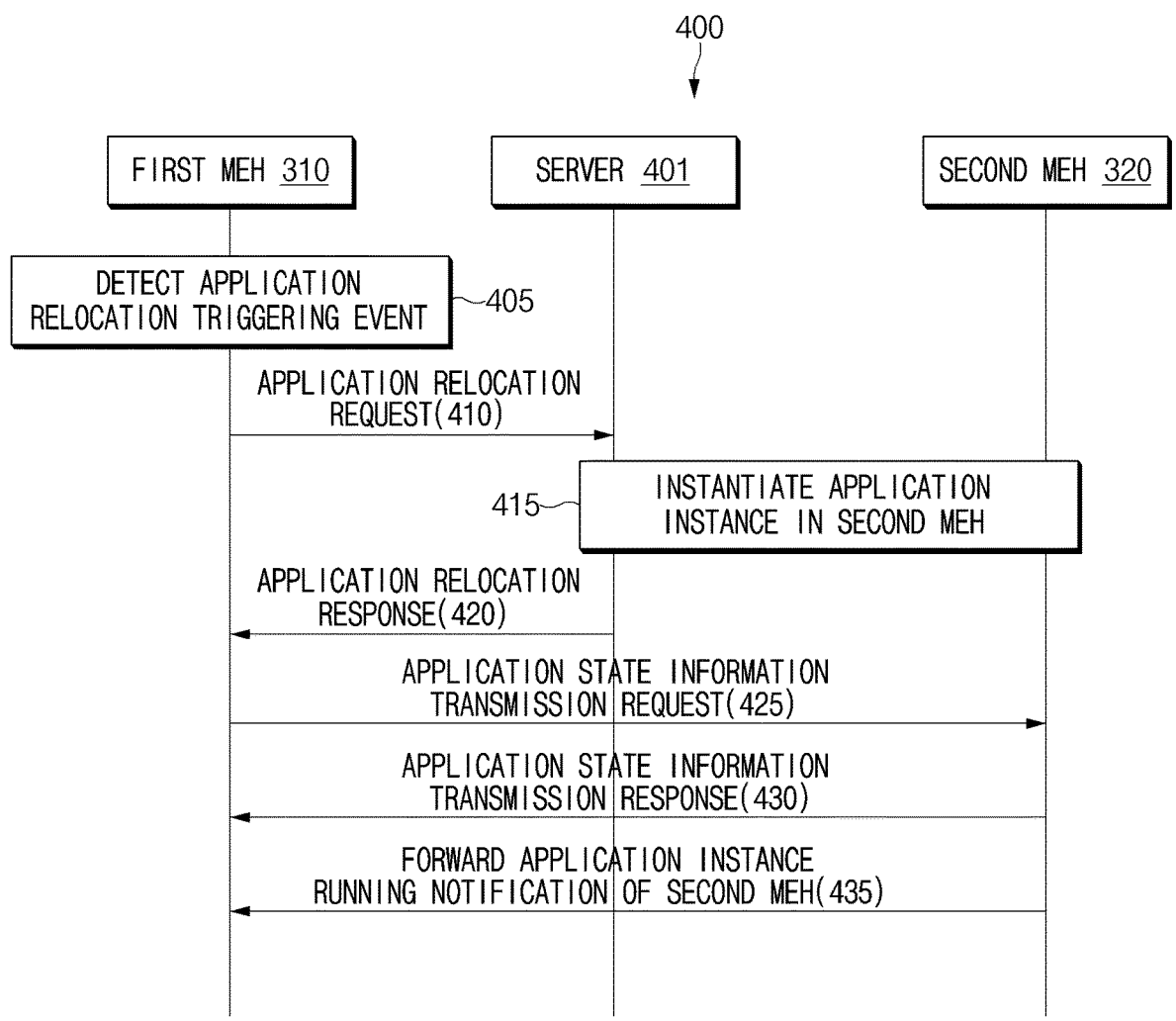
FIG. 4 illustrates a signal sequence diagram for application relocation in an edge computing environment according to certain embodiments.

FIG. 4 illustrates a signal sequence diagram 400 for an example application relocation in an edge computing environment (e.g., an edge computing environment 200 of FIG. 2) according to certain embodiments. The signal sequence diagram 400 of FIG. 4 may refer to ETSI group report (GR) MEC 018 standards.

Referring to FIG. 4, a server 401 may correspond to at least one of a server 230 of FIG. 2, an MEO 302 of FIG. 3, or an REM 305 of FIG. 3. In FIG. 4, it may be assumed that an MEH which serves an electronic device 101 changes from a first MEH 310 to a second MEH 320 by application relocation. In this case, the first MEH 310 may be referred to as a source MEH (an S-MEH) and the second MEH 320 may be referred to as a target MEH (a T-MEH).

In operation 405, the first MEH 310 may detect an application relocation triggering event (hereinafter referred to as a "triggering event"). According to an embodiment, the first MEH 310 may detect the triggering event based on a handover between base stations (e.g., a first base station 211 and a second base station 221 of FIG. 2). According to another embodiment, the first MEH 310 may detect the triggering event based on a condition independent of a handover. For example, the first MEH 310 may detect the triggering event depending on load balancing in an ME App level, an MEO 302 level, or an MEPM 303 level. For another example, when a situation involving performance optimization occurs, the first MEH 310 may detect the triggering event. For another example, the first MEH 310 may detect the triggering event based on at least one of a policy or a reference value set by an operator in an MEC system 350. For another example, the first MEH 310 may detect the triggering event by receiving a request of the electronic device 101 or the first base station 211. According to another embodiment, the first MEH 310 may detect the triggering event based on a combination of at least two or more of the above-mentioned conditions. In this case, the first MEH 310 may detect the triggering event based on priorities or ratios of the conditions.

In operation 410, the first MEH 310 may transmit a message requesting application relocation to the server 401.

In operation 415, the server 401 may instantiate an application in the second MEH 320. For example, when the message is received from the first MEH 310, the server 401 may select the second MEH 320 among a plurality of MEHs and may request the second MEH 320 to instantiate an application.

When the instantiating of the application in the second MEH 320 is successfully completed, in operation 420, the server 401 may transmit a response message to the application relocation request to the first MEH 310.

In operation 425, the first MEH 310 may transmit a message requesting transmission of application state information to the second MEH 320. According to an embodiment, the first MEH 310 may transmit a service state information regarding a UE App 360 together with a request message.

In operation 430, the second MEH 320 may transmit a response message to the transmission of the application state information to the first MEH 310. For example, a second MEP 321 of the second MEH 320 may deliver the service state information regarding the UE App 360 to an ME App (e.g., 323-1, 323-2, 323-3, or 323-4) executing on the second MEH 320, and may enable the ME App. The second MEP 321 may transmit a response message indicating that the service state information is successfully delivered after delivering the service state information.

In operation 435, the second MEH 320 may forward an "application instance running notification" (e.g., a notification indicating present execution of the instantiated application) to the first MEH 310. For example, when the service state information and the service state of the ME App of the second MEH 320 are synchronized with each other, the instance of the ME App may transmit a notification to the second MEP 321. The second MEP 321 may forward the received notification to the first MEH 310.

Figure 5:
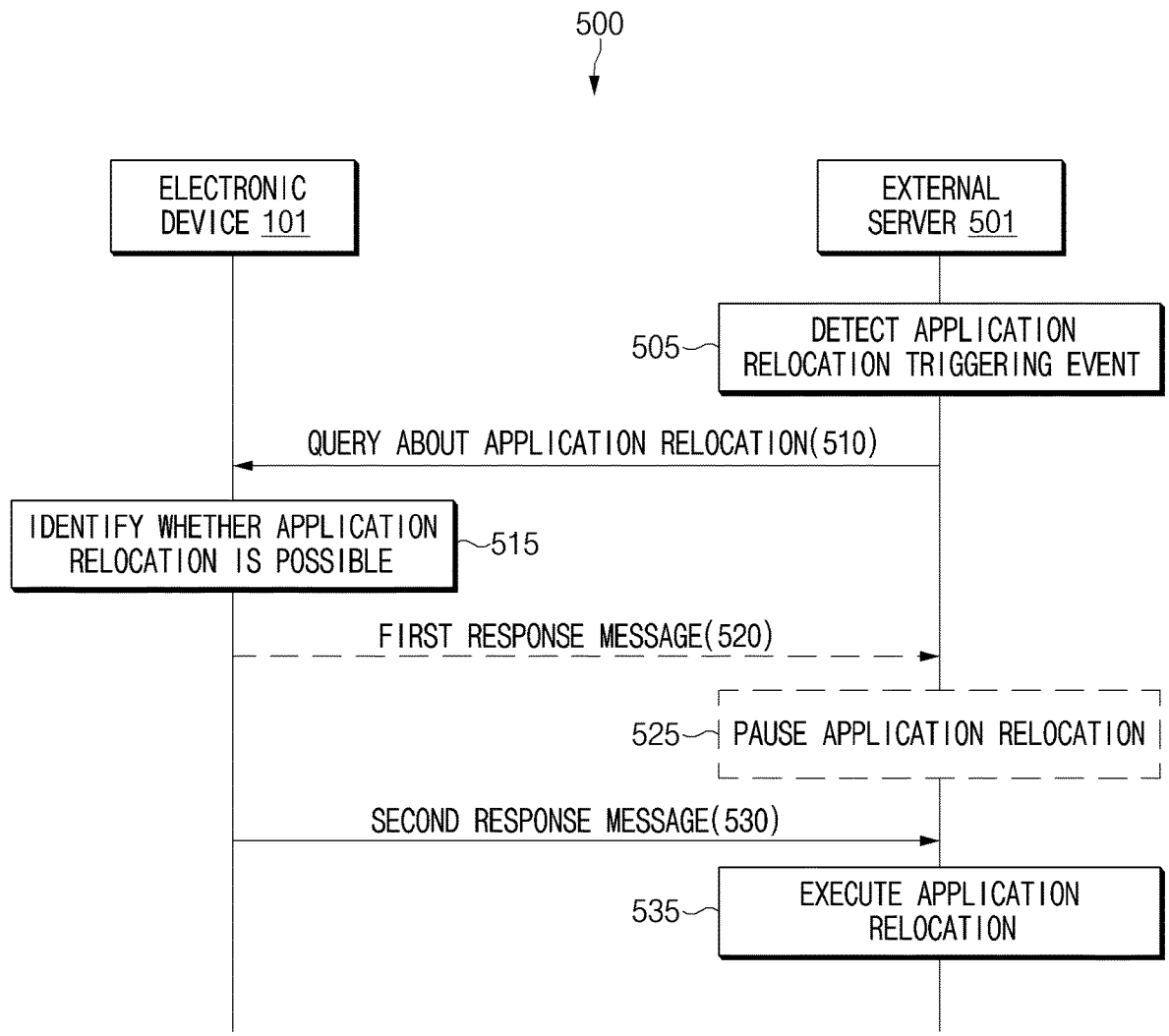
FIG. 5 illustrates a signal sequence diagram for pausing application relocation according to certain embodiments.

FIG. 5 illustrates a signal sequence diagram 500 for pausing application relocation according to certain embodiments.

Referring to FIG. 5, an external server 501 may be a first MEH 310 or a server 401 of FIG. 4. The external server 501 may exchange data with an electronic device 101 through a base station (e.g., a first base station 211 of FIG. 2).

In operation 505, the external server 501 may detect an application relocation triggering event. For example, the external server 501 (when representative of the server 401) may detect the triggering event by receiving a message requesting application relocation from the first MEH 310 to which the electronic device 101 is connected.

In operation 510, the external server 501 may transmit a query message querying whether application relocation is possible to the electronic device 101.

In operation 515, the electronic device 101 may identify whether the application relocation is possible. According to an embodiment, the electronic device 101 may identify a running state of an application which is executing on the electronic device 101, at a time when the query message is received. The running state of the application may include, for example, whether a data transmission duration for executing the application is sensitive to latency or is less sensitive to the latency. When the running state of the application is sensitive to the latency (e.g., meeting or exceeding the latency sensitivity threshold value), this indicates that a disconnection of service is possible if application relocation was to be executed, and as such, the electronic device 101 may determine that the application relocation is impossible. An embodiment of the running state of the application will be described with reference to FIG. 6.

When it is identified that the application relocation is impossible, in operation 520, the electronic device 101 may transmit a first response message responding to the query message. According to an embodiment, the first response message may indicate that the application relocation is impossible.

When the first response message is received, in operation 525, the external server 501 may pause the application relocation. In other words, the external server 501 may neglect, omit or otherwise fail to execute the application relocation. For example, when the external server 501 is the first MEH 310, it may omit performance of operations 410 to 435 of FIG. 4. For another example, when the external server 501 is the server 401, it may omit performance of operations 415 to 435 of FIG. 4. The external server 501 may pause the application relocation until a second response message is received indicating that the application relocation is possible.

When it is identified that the application relocation is possible, in operation 530, the electronic device 101 may transmit a second response message indicating that the application relocation is possible. For example, when the running state of the application is less sensitive to the latency (e.g., less than the latency sensitivity threshold value), the electronic device 101 may transmit the second response message.

In response to receiving the second response message, in operation 535, the external server 501 may execute the application relocation. For example, when the external server 501 is the first MEH 310, it may execute the application relocation by performing operations 410 to 435 of FIG. 4.

According to an embodiment, when it is detected that the application relocation is possible in operation 515, the electronic device 101 may omit operation 520 and may transmit the second response message in operation 530. The external server 501 may omit operation 525 in response to receiving the second response message and may execute the application relocation in operation 535.

Figure 6:
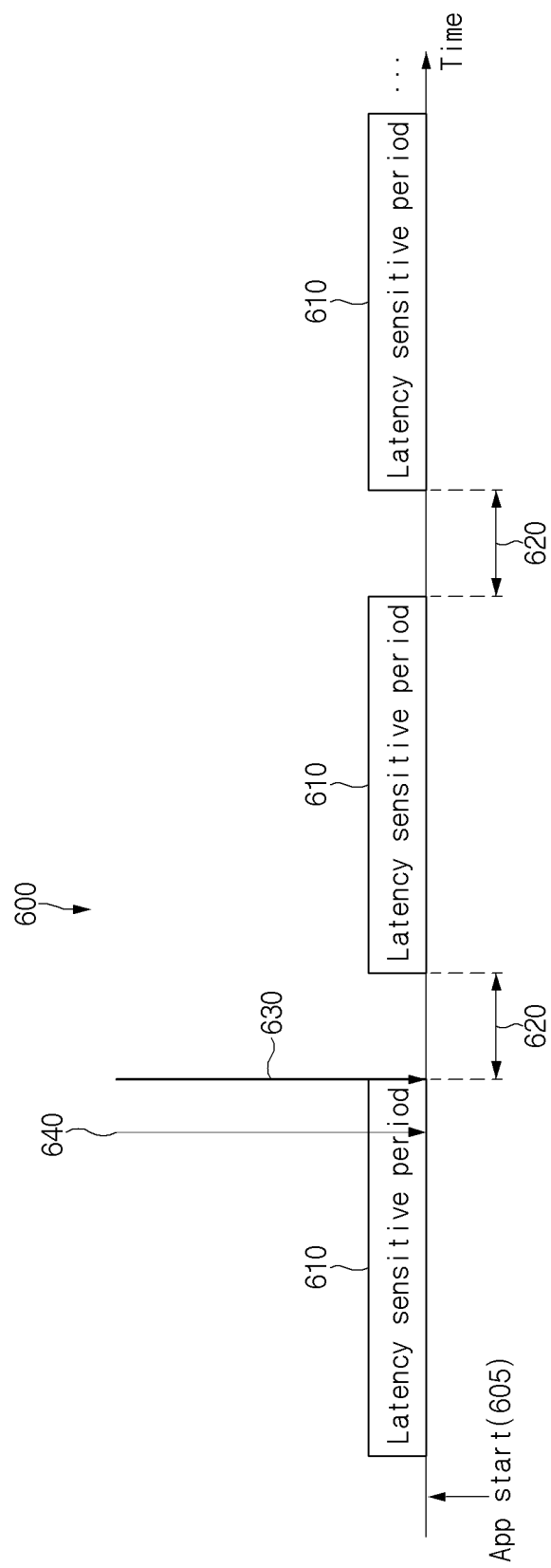
FIG. 6 illustrates a graph indicating a running state of an application over time according to certain embodiments.

FIG. 6 illustrates a graph 600 indicating an example running state of an application over time according to certain embodiments.

Referring to FIG. 6, the horizontal axis of the graph 600 may indicate time. An electronic device 101 may start to run an application (e.g., a UE App 360 of FIG. 3) at a first time 605. While the application is running, the electronic device 101 may perform data transmission associated with execution of the application with a first base station 211 in a series of first periods 610 involving meeting or exceeding the threshold sensitive to latency, and a series of second periods 620 involving a state less than the threshold sensitivity to the latency.

According to an embodiment, the length, ratio, or frequency of the first period 610 and the second period 620 may be determined based on at least one of latency requested by the application, a data transfer rate, or a type of content. For example, when the application is a gaming application, the first period 610 may indicate a period in which a game is proceeding in real time (e.g., a period when a specific stage, such as gameplay, is in progress) and the second period 620 may indicate a period when the game does not proceed in real time (e.g., a period when the specific stage, such as active gameplay, has ended). For another example, when the application is an application supporting a streaming service, the first period 610 may indicate a period when media is being streamed from the streaming service. For another example, the first period 610 may indicate that a frequency of data transmission or an amount of data transmission between an electronic device 101 and a first MEH 310 is greater than or equal to a threshold.

According to an embodiment, when an application relocation triggering event occurs in the second period 620 (or a query message of FIG. 5 is received), the electronic device 101 may determine that application relocation is possible. According to another embodiment, when the application relocation triggering event occurs in the first period 610, the electronic device 101 may determine that the application relocation is impossible.

According to an embodiment, the electronic device 101 may delay an operation time point of application relocation, to ensure continuity of service despite occurrence of the triggering event. For example, when the query message is received from a first base station 211 (or an external server 501) at a second time point 640, the electronic device 101 may delay application relocation triggering up to a third time point 630, in which the first period 610 has ended. The electronic device 101 may insert information about a time until the first period 610 is ended or the third time point 630 into a first response message of operation 520.

FIG. 7 illustrates an example field format 700 of a response message according to certain embodiments. The field format shown in FIG. 7 may include a field format of a first response message transmitted in operation 520 of FIG. 5.

Referring to FIG. 7, the field format 700 may include a first field 710 indicating whether application relocation is possible, a second field 720 indicating resource information utilized until the application relocation is triggered, and a third field 730 indicating time information required until the application relocation is triggered.

According to an embodiment, it is mandatory that the first field 710 may be included in the first response message. The first field 710 may include one-bit information.

According to an embodiment, it is optional that the second field 720 be included in the first response message. When the application relocation is impossible, the electronic device 101 may insert resource information about a resource utilized in an S-MEH (e.g., a first MEH 310 of FIG. 4) into the second field 720 until the application relocation is triggered. The resource information may include at least one of, for example, a memory space, a storage space, or a network bandwidth. According to an embodiment, the second field 720 may indicate the resource information as an absolute value of the resource. For example, when the memory utilization is one gigabyte, the storage space utilizes one gigabyte, and the network bandwidth utilizes 10 megabytes, the second field 720 may indicate an absolute value of the resource in terms such as '1G1G10M'. According to another embodiment, the second field 720 may indicate the resource information via coded information. For example, when the memory space needs one gigabyte, when the storage space needs one gigabyte, and when the network bandwidth needs 10 megabytes, the second field 720 may indicate a bit value such as '10 10 10'.

According to an embodiment, inclusion of the third field 730 in the first response message may be optional. When the application relocation is determined to be impossible, the electronic device 101 may insert time information about a time period until the application relocation is to be triggered into the third field 730. For example, referring to FIG. 6, when a query message is received at a second time point 640, the electronic device 101 may insert time information indicating a difference between a third time point 630 and the second time point 640 into the third field 730. According to an embodiment, the electronic device 101 may insert the time information as an absolute value or coded information. For example, the electronic device 101 may generate time information such that the third field 730 indicates 50 millisecond (ms) as '0001', indicates 100 ms as '0010', and indicates 150 ms as '0011'.

Figure 8:
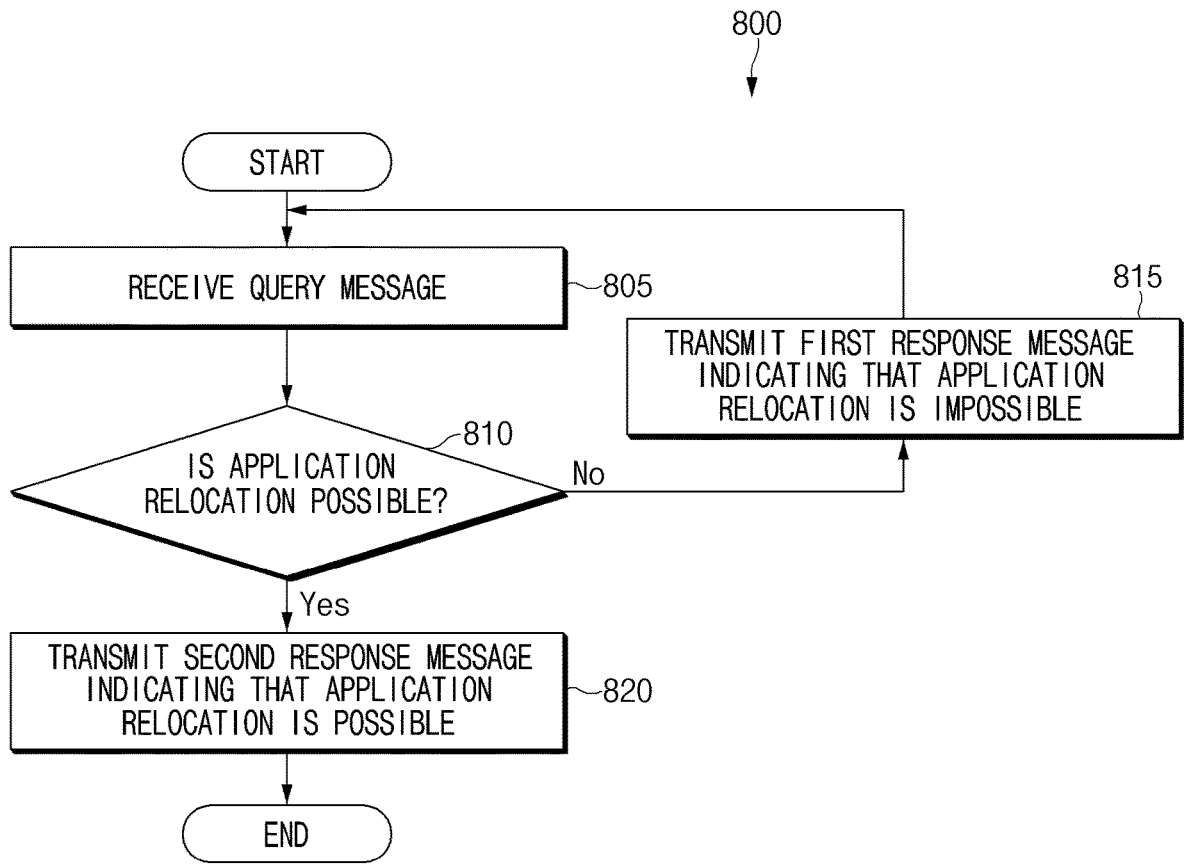
FIG. 8 illustrates an operational flowchart of an electronic device for pausing application relocation according to certain embodiments.

FIG. 8 illustrates an operational flowchart 800 of an electronic device for an example pausing of application relocation according to certain embodiments. Operations included in the operational flowchart 800 may be performed by an electronic device 101 or a component (e.g., a processor 120 or an application 146 of FIG. 1) included in the electronic device 101.

Referring to FIG. 8, in operation 805, the electronic device 101 may receive a query message from an external server (e.g., an external server 501 of FIG. 5). For example, the electronic device 101 may receive the query message from the external server through a base station, while an application (e.g., a UE App 360 of FIG. 3) is running.

In operation 810, based on the received query message, the electronic device 101 may identify whether application relocation is possible. For example, the electronic device 101 may identify whether the application relocation is possible based on whether the running state of the application meets the threshold sensitivity to latency. Whether the running state of the application is sensitive to the latency may be based on at least one of latency specified by the application, a data transfer rate, a type of content, or a frequency of data transmission between the electronic device 101 and an edge server (e.g., a first MEH 310 of FIG. 4), or an amount of the data transmission.

When the application relocation is impossible, in operation 815, the electronic device 101 may transmit a first response message indicating that the application relocation is impossible. According to an embodiment, the first response message may include at least one of resource information utilization, or time information until application relocation will be possible.

According to an embodiment, after transmitting the first response message, the electronic device 101 may repeated performance of operations 805 to 815. FIG. 8 illustrates the embodiment in which the electronic device 101 repeats operations 805 to 815. However, according to another embodiment, the electronic device 101 may repeat operations 810 and 815. In other words, the electronic device 101 may receive a query message once, monitor a running state of the application at a specified period until the application relocation is possible, and repeated transmission of the first response message. According to another embodiment, the electronic device 101 may repeated performing operation 810. In other words, after receiving a query message once and transmitting the first response once, the electronic device 101 may monitor a running state of the application at the specified period until the application relocation is possible.

When the application relocation is determined to be possible in operation 810, then in operation 820, the electronic device 101 may transmit a second response message indicating that the application relocation is possible.

Figure 9:
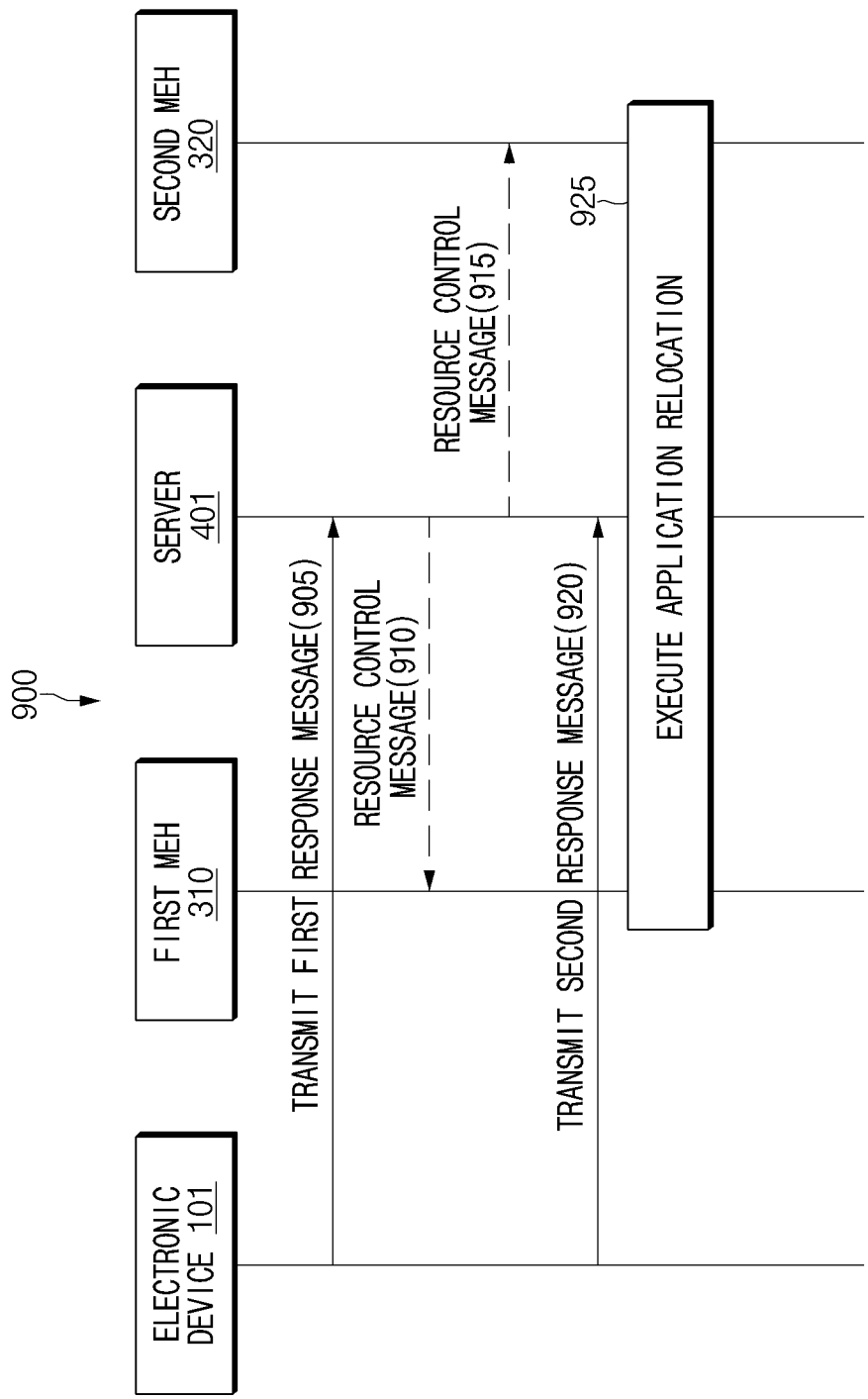
FIG. 9 illustrates a signal sequence diagram for controlling a resource in an edge computing environment according to certain embodiments.

FIG. 9 illustrates a signal sequence diagram 900 for controlling a resource in an edge computing environment (e.g., an edge computing environment 200 of FIG. 2) according to certain embodiments. Operations 910 and 915 shown in the signal sequence diagram 900 may be an example embodiment of operation 525 of FIG. 5.

Referring to FIG. 9, in operation 905, an electronic device 101 may transmit a first response message to a server 401 (operation 520 of FIG. 5). When the first response message is received, the server 401 may pause execution of application relocation.

In operation 910, the server 401 may transmit a resource control message to a first MEH 310. The resource control message may indicate resource information utilized while the application relocation is paused (or until the application relocation is triggered). For example, when the first response message includes a second field 720, the server 401 may deliver resource information indicated by the second field 720 to a virtual infra 312 of the first MEH 310 through a VIM 304.

According to an embodiment, the virtual infra 312 of the first MEH 310 may expand process resource capacity of an ME App (e.g., 313-1, 313-2, 313-3, or 313-4), which provides a service based on the resource information. The process resource capacity may include at least one of, for example, a memory space, a storage space, or a network bandwidth, which is available to the ME App. Through the resource control message, the server 401 may control a resource for an application while application relocation is paused, thus preventing a resource of an S-MEH (e.g., a first MEH 310) from being insufficient.

According to an embodiment, when a resource capable of being added is insufficient, the first MEH 310 may ignore the resource control message. In this case, the first MEH 310 may transmit a response message indicating that the resource control message is ignored to the server 401.

In operation 915, the server 401 may transmit the resource control message to a second MEH 320. For example, when the second field 720 and a third field 730 are included in the first response message, the server 401 may command the second MEH 320 through the resource control message to ensure a utilized resource in advance before application relocation is triggered. According to an embodiment, the server 401 may perform operation 915 at substantially the same time as operation 910, in an order shown in FIG. 9, or vice versa.

After transmitting the resource control message, in operation 920, the electronic device 101 may transmit a second response message indicating that the application relocation is possible, after determination of the same.

In operation 925, the server 401 may execute the application relocation with the first MEH 310 and the second MEH 320. For example, the server 401, the first MEH 310, and the second MEH 320 may perform operations 415 to 435 of FIG. 4. According to an embodiment, the server 401 may store the resource information included in the first response message and may release a resource expanded in the first MEH 310 or the second MEH 320 based on the stored response message, when the application relocation is performed.

Figure 10:
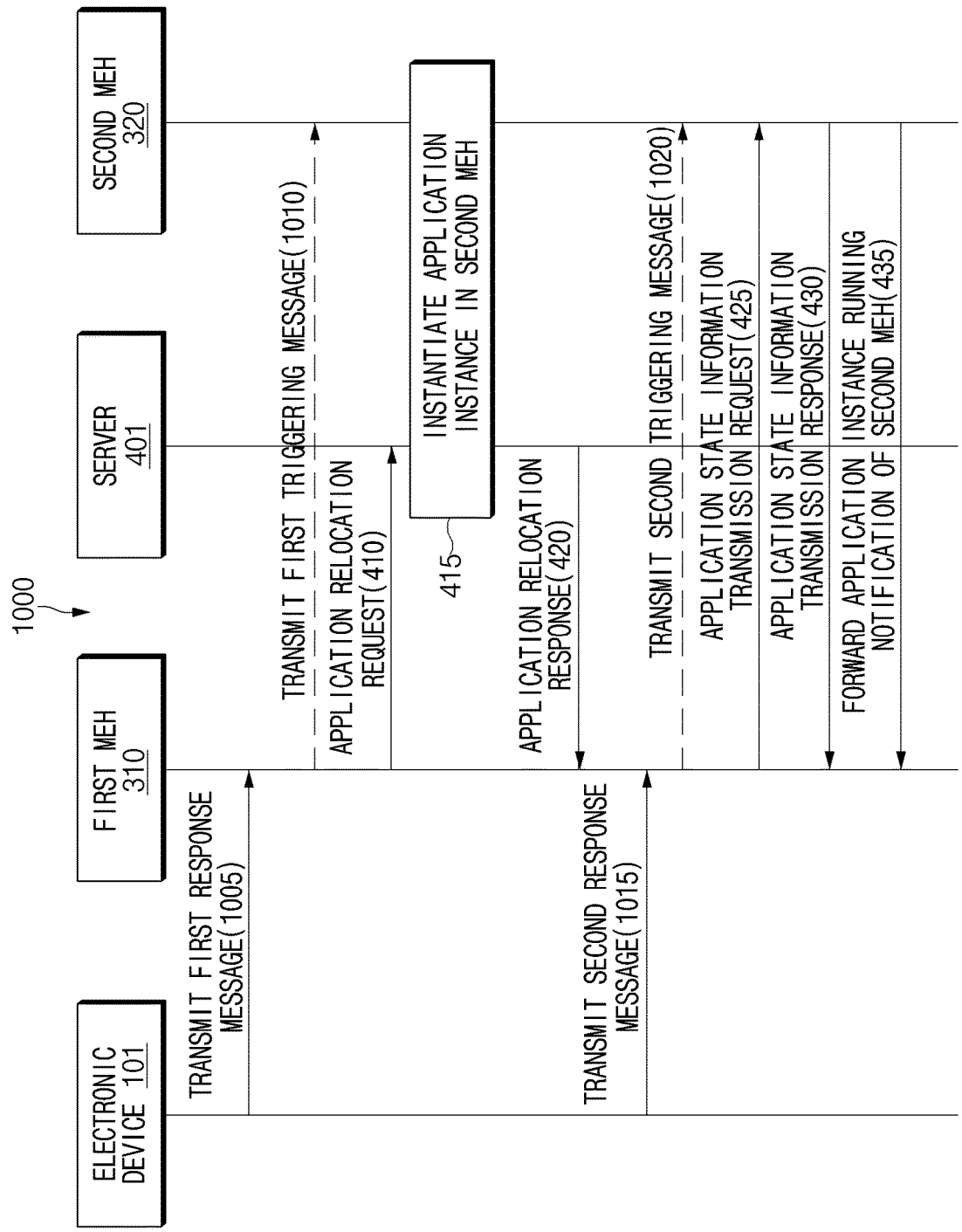
FIG. 10 illustrates a signal sequence diagram for pausing some procedures for application relocation according to certain embodiments.

FIG. 10 illustrates an example signal sequence diagram 1000 for pausing some procedures for application relocation according to certain embodiments.

Referring to FIG. 10, in operation 1005, an electronic device 101 may transmit a first response message to a first MEH 310.

In operation 1010, the first MEH 310 may transmit a first triggering message to a second MEH 320. The first triggering message may command execution of procedures (e.g., operations 410 to 420) for application relocation.

According to an embodiment, the first MEH 310 may abstain, omit or otherwise fail to transmit the first triggering message as a separate message, and may transmit a request message transmitted in operation 410 to a server 401. In this case, the request message may include information indicating execution of some procedures (e.g., operations 415 and 420) among the procedures for the application relocation. According to an embodiment, the server 401 may store information included in the request message to manage such that subsequent procedures (e.g., operations 425 and 435) are not repeatedly performed.

According to an embodiment, after operation 420 is performed, the first MEH 310 may abstain, omit or otherwise fail to perform subsequent procedures (e.g., operations 425 to 435), until a second response message is received from the electronic device 101. In operation 1015, the electronic device 101 may transmit the second response message to the first MEH 310.

In operation 1020, the first MEH 310 may transmit a second triggering message indicating triggering of a subsequent procedure to the second MEH 320. According to an embodiment, the first MEH 310 may transmit the second triggering message to the server 401, as well as the second MEH 320.

After the second triggering message is transmitted, the first MEH 310 and the second MEH 320 may perform subsequent processes. For example, the first MEH 310 and the second MEH 320 may perform operations 425 and 430.

According to an embodiment, the first triggering message and the second triggering message may include a field format, at least a portion of which is similar to the field format 700 described in FIG. 7. For example, the first triggering message and the second triggering message may include one-bit information indicating attributes of the message. The attributes of the message may indicate whether the transmitted message is the first triggering message or the second triggering message. For another example, the first triggering message and the second triggering message may include at least one of resource information or time information.

Through the above-mentioned method, an MEC system (e.g., an MEC system 350 of FIG. 3) may pause application relocation to ensure continuity of service and simultaneously perform some procedures in advance, thus reducing a time utilized for the application relocation.

As described above, an electronic device (e.g., 101 of FIG. 1) in an edge computing environment may include a memory (e.g., 130 of FIG. 1) storing an application, a wireless communication circuitry (e.g., at least a part of a wireless communication module 192 of FIG. 1), and at least one processor (e.g., 120 of FIG. 1) operatively connected with the memory and the wireless communication circuitry. The at least one processor may be configured to receive a query message querying whether application relocation is possible from an external server (e.g., 501 of FIG. 5), via the wireless communication circuitry, identify whether the application relocation is possible based on a running state of the application, in response to receiving the query message, and transmit a first response message indicating that the application relocation is impossible to the external server, via the wireless communication circuitry, when the application relocation is impossible, or transmit a second response message indicating that the application relocation is possible to the external server, via the wireless communication circuitry, when the application relocation is possible.

According to an embodiment, the at least one processor may be configured to identify that the application relocation is impossible, when the running state of the application is sensitive to latency, and identify that the application relocation is possible, when the running state of the application is less sensitive to the latency.

According to an embodiment, the at least one processor may be configured to identify whether the running state of the application is sensitive to the latency, based on at least one of the latency specified by the application, a data transfer rate, or a content type of the application.

According to an embodiment, the at least one processor may be configured to identify whether the running state of the application is sensitive to latency, based on at least one of a frequency or an amount of data transmission between the electronic device and the external server.

According to an embodiment, the at least one processor may be configured to insert at least one of resource information or time information into the first response message. The resource information indicates a resource for running of the application until the application relocation is possible, and the time information may indicate a resource utilized until the application relocation is possible.

According to an embodiment, the resource information may indicate at least one of a memory space, a storage space, or a network bandwidth.

According to an embodiment, the at least one processor may be configured to insert at least one of the resource information or the time information as an absolute value or coded information into the first response message.

According to an embodiment, the at least one processor may be configured to monitor the running state of the application on a periodic basis, after transmitting the first response message, and transmit the second response message to the external server via the wireless communication circuitry, when the application relocation is possible as a result of the monitoring.

As described above, a method of an electronic device (e.g., 101 of FIG. 1) in an edge computing environment may include receiving (510 of FIG. 5) a query message querying whether application relocation is possible from an external server, identifying (e.g., 515 of FIG. 5) whether the application relocation is possible based on a running state of the application, in response to receiving the query message, and transmitting (e.g., 520 of FIG. 5) a first response message indicating that the application relocation is impossible to the external server, when the application relocation is impossible or transmitting (e.g., 530 of FIG. 5) a second response message indicating that the application relocation is possible to the external server, when the application relocation is possible.

According to an embodiment, the identifying of whether the application relocation is possible may include identifying that the application relocation is impossible, when the running state of the application is sensitive to latency, or identifying that the application relocation is possible, when the running state of the application is less sensitive to the latency.

According to an embodiment, the identifying of whether the running state of the application is sensitive to the latency may include identifying whether the running state of the application is sensitive to the latency, based on at least one of the latency amount specified by the application, a data transfer rate, or a content type of the application.

According to an embodiment, the identifying of whether the running state of the application is sensitive to the latency may include identifying whether the running state of the application is sensitive to the latency, based on at least one of a frequency or an amount of data transmission between the electronic device and the external server.

According to an embodiment, the method may further include inserting at least one of resource information or time information into the first response message, when triggering is impossible. The resource information indicates a resource for running of the application until the application relocation is possible, and the time information may indicate a resource utilized until the application relocation is possible.

According to an embodiment, the resource information may indicate at least one of a memory space, a storage space, or a network bandwidth.

According to an embodiment, the method may further include monitoring the running state of the application on a periodic basis, after transmitting the first response message, and transmitting the second response message to the external server, when the triggering is possible as a result of the monitoring.

As described above, an external server (e.g., 501 of FIG. 5) in an edge computing environment may include detecting a triggering event of application relocation, transmitting a query message querying whether the application relocation is possible to an electronic device which receives an edge computing service, pausing the application relocation, when a first response message indicating that the application relocation is impossible is received from the electronic device, and executing the application relocation, when a second response message indicating that the application relocation is possible is received from the electronic device.

According to an embodiment, the first response message may include at least one of resource information or time information, the resource information indicates a resource utilized for running of the application until the application relocation is possible, and the time information may indicate a resource utilized until the application relocation is possible.

According to an embodiment, the external server may be configured to expand at least one of a memory space, a storage space, or a network bandwidth for an application run on the external server, based on the resource information.

According to an embodiment, the external server may be configured to transmit a first triggering message indicating triggering some procedures of application relocation to a second external server for performing the application relocation with the external server, in response to receiving the first response message, perform some procedures of the application relocation with the second external server, after transmitting the first triggering message, receive the second response message from the electronic device, transmit a second triggering message indicating triggering the remaining procedures of the application relocation to the second external server, and perform the remaining procedures of the application relocation.

According to an embodiment, the external server may include an MEC edge server based on ETSI MEC standards.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Certain embodiments of the present disclosure may be implemented as software (e.g., a program) including one or more instructions stored in a storage medium (e.g., an internal memory 136 or an external memory 138) readable by a machine (e.g., an electronic device).

For example, a processor (e.g., a processor 120) of a machine (e.g., an electronic device 101) may invoke at least one instruction among one or more stored instructions from the storage medium and may execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device in an edge computing environment, the electronic device comprising:
   a memory storing an application;
   wireless communication circuitry; and
   at least one processor operatively connected with the memory and the wireless communication circuitry,
   wherein the at least one processor is configured to:
   receive a query message querying whether application relocation is possible from an external server, via the wireless communication circuitry;
   identify whether the application relocation is possible based on a running state of the application, in response to receiving the query message; and
   when the application relocation is impossible, transmit a first response message indicating that the application relocation is impossible to the external server, via the wireless communication circuitry, or
   when the application relocation is possible, transmit a second response message indicating that the application relocation is possible to the external server, via the wireless communication circuitry.

2. The electronic device of claim 1, wherein the at least one processor is configured to:
   identify that the application relocation is impossible, when at least one characteristic associated with the running state of the application indicates sensitivity to latency; or
   identify that the application relocation is possible, when the at least one characteristic associated with the running state of the application indicates non-sensitivity to the latency.

3. The electronic device of claim 2,
   wherein the at least one characteristic includes at least one of a latency specified by the application, a data transfer rate, or a content type of the application, and
   wherein the sensitivity is indicated when a present latency is equal to or greater than the latency specified by the application, when the data transfer rate is less than a prespecified threshold transfer rate, or when the content type matches a prespecified content type associated with the sensitivity to latency.

4. The electronic device of claim 2,
   wherein the at least one characteristic includes on at least one of a frequency or an amount of data transmission between the electronic device and the external server, and
   wherein the sensitivity is indicated when the frequency of data transmission is equal to Or greater than a threshold frequency, or when the amount of data transmission is equal to or greater than a threshold amount.

5. The electronic device of claim 1, wherein the at least one processor is configured to:
   insert at least one of resource information or time information into the first response message, and
   wherein the resource information indicates a resource utilized for running the application until the application relocation is possible, and the time information indicates a time period until the application relocation is possible.

6. The electronic device of claim 5, wherein the resource information indicates at least one of a memory space, a storage space, or a network bandwidth.

7. The electronic device of claim 5, wherein
   the resource information or the time information is inserted into the first response message as an absolute value, or as coded information.

8. The electronic device of claim 1, wherein the at least one processor is configured to:
   after transmitting the first response message, monitor the running state of the application on a periodic basis; and
   when the monitoring of the running state determines that the application relocation is possible, transmit the second response message to the external server via the wireless communication circuitry.

9. A method of an electronic device in an edge computing environment, the method comprising:
- receiving a query message querying whether application relocation is possible from an external server through wireless communication circuitry;
- identifying, using at least one processor, whether the application relocation is possible based on a running state of the application, in response to receiving the query message; and
- when the application relocation is impossible, transmitting a first response message indicating that the application relocation is impossible to the external server, Or
- when the application relocation is possible, transmitting a second response message indicating that the application relocation is possible to the external server.

10. The method of claim 9, wherein the identifying whether the application relocation is possible further includes:
- identifying that the application relocation is impossible, when at least one characteristic associated with the running state of the application indicates sensitivity to latency; or
- identifying that the application relocation is possible, when the at least one characteristic associated with the running state of the application indicates non-sensitivity to the latency.

11. The method of claim 10,
- wherein the at least one characteristic includes at least one of a latency specified by the application, a data transfer rate, or a content type of the application, and
- wherein the sensitivity is indicated when a present latency is equal to or greater than the latency specified by the application, when the data transfer rate is less than a prespecified threshold transfer rate, or when the content type matches a prespecified content type associated with latency.

12. The method of claim 10,
- wherein the at least one characteristic includes a frequency or an amount of data transmission between the electronic device and the external server, and
- wherein the sensitivity is indicated when the frequency of data transmission is equal to or greater than a threshold frequency, or when the amount of data transmission is equal to or greater than a threshold amount.

13. The method of claim 9, further comprising:
- inserting at least one of resource information or time information into the first response message, when triggering is impossible,
- wherein the resource information indicates a resource utilized for running the application until the application relocation is possible, and the time information indicates a time period until the application relocation is possible.

14. The method of claim 13, wherein the resource information indicates at least one of a memory space, a storage space, or a network bandwidth.

15. The method of claim 14, further comprising:
- after transmitting the first response message monitoring the running state of the application on a periodic basis; and
- when the triggering is possible as a result of the monitoring, transmitting the second response message to the external server.

* * * * *